March 15, 1960     L. HUNSINGER     2,928,422
MIXING FAUCET Filed April 25, 1957     6 Sheets-Sheet 4

March 15, 1960 L. HUNSINGER 2,928,422
MIXING FAUCET
Filed April 25, 1957 6 Sheets-Sheet 5

Fig. 11.

Inventor:
Lukas Hunsinger.
By. Lee & Lee Attys.

United States Patent Office 2,928,422
Patented Mar. 15, 1960

2,928,422

MIXING FAUCET

Lukas Hunsinger, Chicago, Ill.

Application April 25, 1957, Serial No. 655,080

16 Claims. (Cl. 137—597)

This invention relates to mixing faucets and particularly relates to an improved form of mixing valve for use with faucets such as are used with bathtubs, and to which a shower head may be operatively connected, bathroom lavatories, kitchen sink faucets and kitchen sink faucets in combination with a sprayer for spraying dishes. The sprayer is operatively connected to a hose which in turn is operatively connected to the faucet.

A principal object of the invention is to provide an improved valve which combines the functions of mixing two separate fluid streams of the cold and hot water supply in blended discharge and controlling the temperature of the discharge from cold through the blended temperature to hot, and also controlling the quantity of discharge from a full flow to a completely shut-off condition. The invention is particularly useful in various embodiments of hot and cold water faucets conventionally used in the modern home and supplants the use of separate faucets for controlling the hot and cold water supply.

Another object of the invention is to provide a valve having a single control member having a universal movement and adapted when positioned between one set of fixed positions to control the blending of the fluids, and when moved between another set of opposed positions to control the quantity of flow.

Still another object of the invention is to provide a valve construction for faucets of the type as used in the modern home in which the control member may assume any one of an infinite number of positions which may lie either in or intermediate the planes of movement between the aforesaid opposed positions so that any desired combination of blending and volume of flow may be attained.

A further object of the invention is to provide a valve mechanism which may discharge cold water from its closed position to its full maximum open position and with intermediate quantities therebetween, and similarly discharge only hot water from its full open position to its full closed position and intermediate positions therebetween, and also to blend the fluids, for example, from cold to hot and intermediate thereof from the maximum discharge to a shut-off position and intermediate positions thereof.

Another object of the invention is to provide a combined mixing valve and volume control valve for mixing faucets wherein complicated valve-operating mechanism and valve constructions for each of the fluids are reduced. A particularly typical problem in such a development has been the problem of sealing a universally movable valve control mechanism with respect to the several flow control valves with which it must function. Therefore, another object of my invention is to provide a combined volume and blending control valve which is provided with relatively simple and efficient means for sealing the valve elements with respect to the passages for the flow of both fluids.

A still further object of the invention is to provide a valve control for mixing faucets which permits ready replacement of the valve and sealing means for the respective fluid passages with a minimum of difficulty so that the ordinary home owner may repair the mixing valve of this construction without recourse to hiring a plumber. With this improved mixing faucet construction, it is possible to replace worn sealing gaskets as simply as in a conventional single-flow faucet.

A still further object of the invention is to provide a valve construction provided with sealing means which will not leak.

Another object of the invention is to provide a valve construction which in addition to the above features, is simple, easily constructed, readily taken apart for repair or replacement of parts and is extremely sturdy and durable.

Still another object of the invention is to provide a mixing valve of this character having an improved mixing valve in combination with sprayer means for spraying hot or cold water or blended between the maximum temperatures and in which a simple valve means is provided in combination with a mixing valve for controlling the discharge either to the discharge spout of the faucets or to the spraying means.

In order to accomplish the various objects of the invention, I have provided an improved mixing faucet and mixing valve therefor, wherein the mixing valve may be universally operated for controlling the temperature of fluids from two sources of fluid—preferably hot and cold water as used in the home, and in which there is provided a spring-biased spherical control means operatively connected to linkages which in turn are operatively connected to a valve for each of the fluid passages so that not only the quantity of fluid may be controlled but also a mixture of the two fluids intermediate the temperature range of the cold and hot fluids. In one embodiment of my invention, I have disclosed this improved form of mixing valve with a faucet as used with a bathtub and wherein there is an auxiliary valve for control of the fluid to a shower head, and either hot, cold or blended fluids may be discharged from the shower head.

In another embodiment of my invention, the improved mixing faucet and mixing valve is used for mixing and blending hot and cold fluids or discharge of either, and regulating the flow thereof for the conventional kitchen sink.

In another embodiment of my invention, the improved mixing faucet and mixing valve therefor, is adapted for use with a bathroom lavatory of conventional construction.

In still another embodiment, the improved mixing faucet and mixing valve therefor is used with a conventional form of sprayer so that hot, cold or a blended mixture of fluid may be either discharged directly to the sink, or by manipulating an auxiliary valve the fluid, in its blended or hot or cold condition, is discharged to the spray head in regulated amounts.

Many other objects and advantages of the construction herein shown and described will be obvious to those skilled in the art from the disclosure herein given.

To this end, my invention consists in the novel construction, arrangement and combination of parts herein shown and described and more particularly pointed out in the appended claims.

Referring now to the accompanying drawings forming part of the specification.

Referring now more particularly to the drawings, each of the embodiments of the improved mixing faucet will be described, and wherein the same or similar structures are used in each embodiment, the same or prime reference characters will be utilized to identify similar parts. As an example of one form of my improved mixing faucet, particularly adapted for use as a mixing faucet for bathtubs and incorporating a valve construction for diverting the mixed fluids to a shower head will be particularly described with reference to Figs. 1 through 5. In Figs. 1 through 5 inclusive, is shown a mixing valve 20 adapted to control the blending and volume of flow of streams of hot and cold water from hot and cold water pipes 21 and 22, respectively. The valve 20 comprises a main body portion 23 formed with tapped holes 24 and 25 to receive the pipes 21 and 22. Similarly formed drilled passageways 26 and 27 are in communication with the tapped holes 24 and 25, the tapped holes preferably tapped to receive a one-half inch pipe. A mixing chamber 28, Figs. 1, 2, 4 and 5 is in communication with the fluid passageways 26 and 27.

Integrally formed with the main body portion 23 is a boss 29 having a threaded opening 30 to receive a one-half inch pipe 31 which is connected to a shower head, if desired, or if a shower head is not used, this tapped opening may be closed with a conventional pipe plug. The threaded opening 30 communicates with a passageway 32 which in turn extends to the mixing chamber 28. The mixing chamber is not only connected to the passageway 32 for discharge of the mixed fluids to a shower head but is also operatively connected to a chamber 33 formed in a spout housing 34. The spout housing 34 is provided with a discharge spout 35 formed with a passageway 36 connected to the chamber 33 through a combined opening and valve seat 37.

In order to control the discharge of the fluid from the mixing chamber 28 to either the discharge spout 35 or to a shower head connected to the pipe 31, a vertical lift valve 38 is provided. This vertical lift valve comprises a valve stem 38' vertically mounted in a complementally formed opening 39 preferably drilled within the spout housing 34 and suitably reamed for close tolerances to slidably receive the valve stem 38. On the lower end of the stem 38, and mounted within the chamber 33 is a valve member 40. The valve member 40 comprises a disc-like or ball member 41 formed with a collar and provided with an opening to detachably mount the lower end of the valve stem 38. The disc-like member 41 may be affixed to the valve stem by a pin 42 or other well known securing means. Affixed to the bottom face of the disc-like member 41 is a gasket 43 formed of rubber, neoprene or other suitable material to withstand the temperatures of the fluid being controlled with this mixing faucet. The gasket 43 may be cemented or affixed to the member 41 by a conventional screw in threaded engagement with the disc-like member 41 as is well understood in this art.

A spherical knob 44 is preferably threaded to the outer end of the valve stem 38. In order to prevent leakage of the fluid from the chamber 28 about the peripheral surface of the valve stem 38, a suitable gasket 45 is complementally formed to a recess 46 and provided with an opening through which the valve stem 38 is slidably mounted. A compression nut 47 has a threaded end 48 complementally formed to a threaded opening 49 formed in the upper face of the spout housing 34. The compression or packing nut 47 is preferably knurled at 47' in order to suitably tighten the nut against the packing or gasket 45 to compress the gasket about the peripheral surface of the valve stem to prevent leakage of fluid, and at the same time permit vertical movement of the valve stems through the packing.

Figures 1, 2:
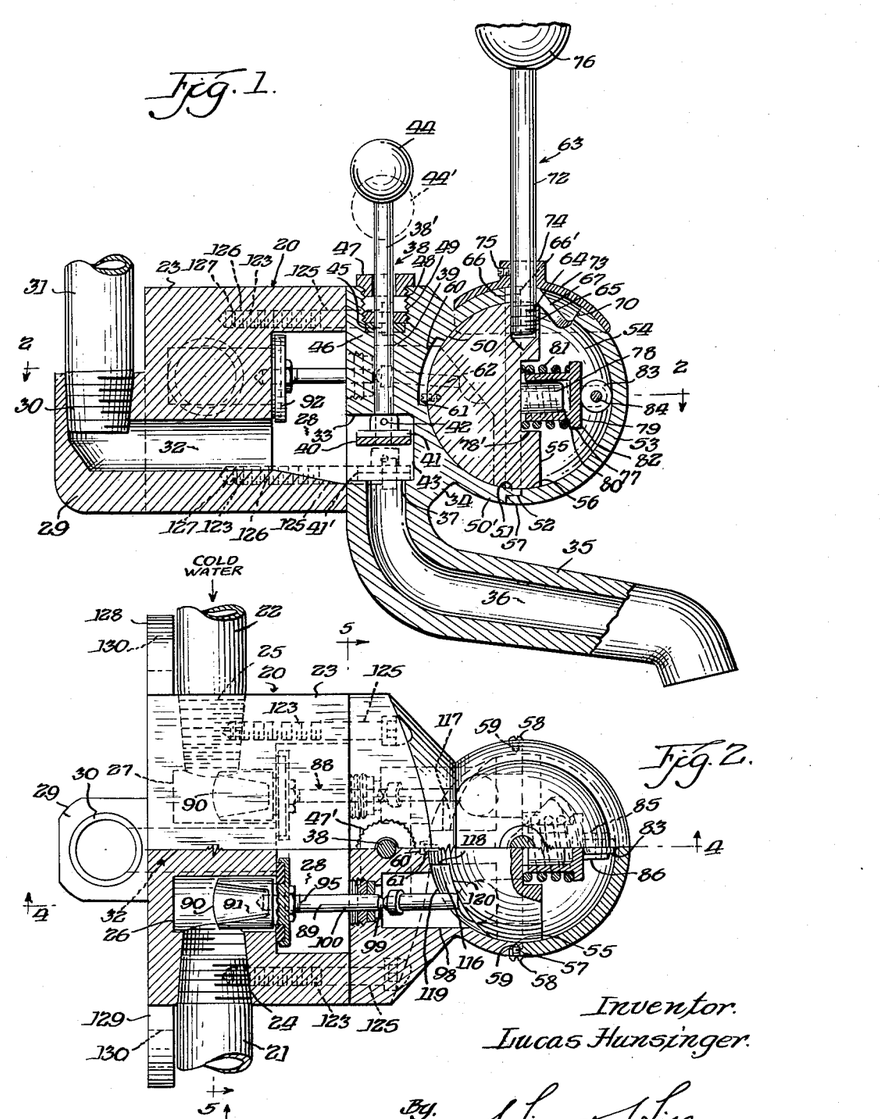
Fig. 1 is a view in elevation, partly in cross-section illustrating one embodiment of my invention for an improved mixing faucet comprising an improved valve construction for mixing two separate streams, and particularly adapted as a bathtub faucet and incorporating valve mechanism for controlling the fluids to a shower installation.
Fig. 2 is a plan view taken along line 2—2, looking in the direction of the arrows and partly in cross-section, of the embodiment of Fig. 1.

In the raised position of the vertical lift valve 38, as shown in the solid position of the disc-like member 41, Fig. 1, the hot or cold fluid or mixture thereof, may discharge in the mixing chamber 28 through the opening 37 through the passageway 36 of the spout 35. In the closed position of the vertical lift valve 38, as shown by the dotted position of the like member 41' by the corresponding dotted position 44' of the spherical knob, the opening 37 is closed and the hot or cold fluid or mixed fluid from the chamber 28 is discharged through the passage 32 through the pipe 31 to the spray head of the bathtub shower (not shown).

In order to control the fluid passageways 26 and 27 and to provide for complete shut-off of these passageways and to provide for mixing or blending of the fluids, the improved valve construction and controls therefor of my invention will be described more particularly with respect to the showing in Figs. 1, 2, 3, 4 and 5. With this improved mixing valve construction, both openings from the mixing chamber 28 to the passageways 26 and 27 may be simultaneously closed so there is no flow from either passageway, and it is also possible to keep one passage shut while the other is open and vice versa, and to open the valve so there is maximum flow from both passages for full intermixing of the fluids and there may also be intermediate mixing of the fluids by proportioning the flow of fluids to so intermix or blend the fluids from cold to hot to full blend and the intermixing thereof as desired within this range. It is also possible to so control the valves that the amount of cold or hot water may be controlled from full shut-off position to maximum discharge and intermediate positions therein for varying the flow between shut-off to maximum discharge. The spout housing 34 is provided with a semi-spherical opening 50. The outer peripheral edge is provided with an annular lip 51 which complementally receives an annular recess 52 of a semispherical housing 53. The semi-spherical housing portion 50' integrally formed with the spout housing 34, and the semi-spherical housing 53, provides a spherical chamber having a spherical surface 54 which receives a substantially semi-spherical valve-operating member 55 in which the spherical surface 56 is so machined as to be complemental to the spherical surface 54 of the semi-spherical housing members 50' and 53. An annular lip 57 forming the recess 52 for receiving the annular lip 51 are affixed together by peripherally arranged set screws 58, Fig. 2, threadably received in the annular lip 57 and engaging suitable openings 59 peripherally spaced about the periphery of the annular lip 51. An arcuate slot 60, Figs. 1 and 2, provides for the range of vertical arcuate movement of the semi-spherical valve-operating member 55, and a set screw 61 in threaded engagement with the opening 62 of the valve-operating member 55 extends slightly above the peripheral surface of the valve-operating member 55, and within the arcuate slot 60. The upper and lower ends of the arcuate slot 60, upon movement of the valve-operating member 55, provides stops for the set screw 61. In the position of the set screw 61, in Fig. 1, the valve-operating member 55 is in the closed position wherein the valves for the passages 26 and 27 are closed. In the upper position with the set screw 61 engaging the upper end of the arcuate slot 60, the valves for the passages 26 and 27 are in their maximum open positions for either valve, depending upon the position of the operating handle 63, i.e. whether it is in the maximum open position for the cold water or hot water passage or in the intermediate full open position for the blended mixture. The blending of the water will be described later under the description of operation. The set screw 61 also serves as a pivot point for transverse movement of the valve-operating member 55 in its lateral angular movement from the full closed position of the handle 63 to a full open position therefor, for the discharge of cold water; and the full open position therefor, for the discharge of hot water and the intermediate mixing position.

Figure 3:
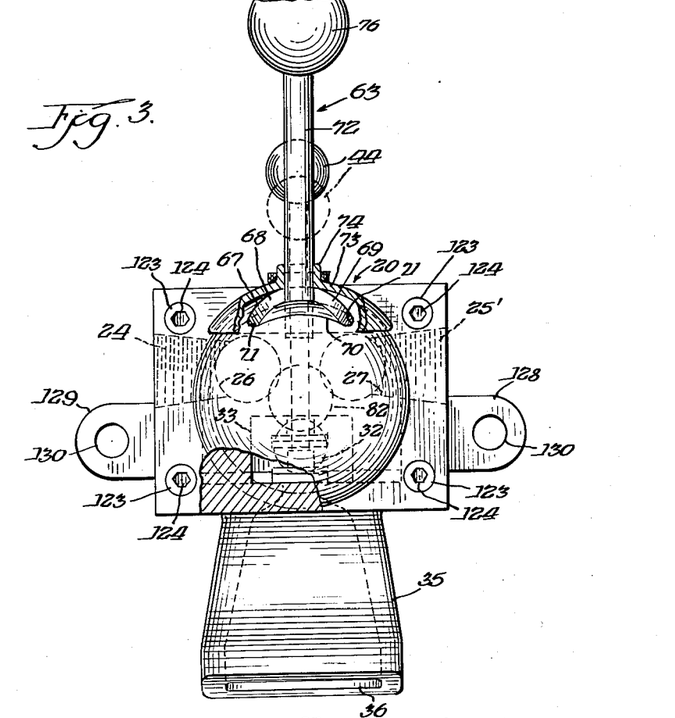
Fig. 3 is an end view in elevation of the mixing faucet of Fig. 1.
Figure 4:
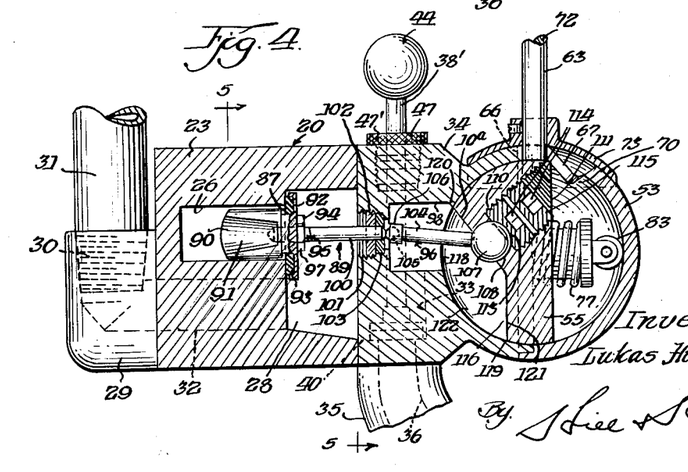
Fig. 4 is a view in elevation partly in cross-section taken along line 4—4 of Fig. 2, looking in the direction of the arrows, illustrating the valve operating mechanism of the mixing faucet of Fig. 1.

The operating handle 63 has a lower threaded end 64 for threaded engagement with a threaded opening 65 in the valve-operating member 55. The semi-spherical housing 50' is formed with a U-shaped notch 66 for locating the handle 63 in the off position of the mixing valve. The semi-spherical housing 53 is also formed with a similarly formed U-shaped notch 66'. These notches 66 and 66' extend through the annular lip portions 51 and 57 of the semi-spherical housings 50' and 53. A spherical triangular opening 67, Figs. 1, 3 and 4, is formed in the semi-spherical housing 53 and the legs 68 and 69 at the upper ends terminate in the U-shaped slot 66' for the operating handle 63. The legs of the U-shaped slot 66 in the semi-spherical housing 50' also form a portion of the legs 68 and 69 of the spherical triangular opening 67. The semi-spherical triangular opening 67 is also formed with a base 70. The legs 68 and 69 join with the base 70 in arcuate shape 71 complementally formed to the peripheral surface of the spindle 72 of the operating handle 63. To provide a closure for the spherical triangular opening 67, a housing member 73 shaped as illustrated in Figs. 1, 3 and 4, is complementally formed to the outer spherical surface of the semi-spherical housings 50' and 53, so that as the operating handle 63 is moved from its closed position to full open position for maximum delivery of either hot or cold, or in the intermediate mixing position, the spherical triangular opening 67 is always covered. A collar 74 integrally formed with the housing member 73 permits the housing member to be detachably mounted upon the spindle 22 when the handle 63 is detached from the valve-operating member 55. The housing member 73 is held in its adjusted position to permit ease in movement of the operating handle 63 by a set screw 75 complementally formed to a threaded opening in the collar 74 and engaging the peripheral surface of the spindle 72, as shown in Figs. 1 and 4. An ornamental knob 76 which may be of plastic or other suitable material is threadably mounted on the outer end of the spindle 72. The knob permits engagement thereof by the operator's hand for manipulating the operating handle 63 in any of the adjusted positions from open to closed.

In order to maintain the valve-operating member 55 in any of the adjusted positions of the handle members, spring-biasing means 77 is provided as illustrated in Figs. 1, 2 and 4. In order to mount the spring-biasing means 77, a stud 78 is integrally formed with the valve-operating member 55 by machining, or otherwise suitably formed by means of a separate stud detachably affixed to the valve-operating member. An annular recess 78' is formed about the stud 78 to mount therein the inner end of a cylindrical-shaped member 79 formed with a cylindrical opening 80 complementally formed to slidably mount the cylindrically shaped member 79 on the stud 78. The cylindrical-shaped member or spring retainer 79 supports a compression spring 81 on the outer peripheral surface of the spring retainer 79. Outward movement of the spring 81 is prevented by an integrally formed disc 82 slightly larger in diameter than the diameter of the spring 81. A roller 83 is journaled on a threaded pin 84 provided with a screw slot on one end and threads on the other end for detachably mounting the pin to the spaced support members 85 and 86 integrally formed with the disc 82 of the spring retainer 79. The threaded pin engages a threaded opening in one of the supports 86 for repair and replacement of the roller 83. It is preferred that the roller shall be hardened, and in the assembled position, as shown in Figs. 1, 2 and 4, the roller 83 operatively engages the inner peripheral surface 54 of the semi-spherical housing 53. As the peripheral surface 54 is also similar to the peripheral surface of the semi-spherical housing portion 50', the valve-operating member 55 may suitably rotate within the spherical housing formed by the housing members 50' and 53', and be held in spring-biased engagement therewith.

The spring-biasing means 77 not only serves to retain the valve-operating member 55 in contact with the peripheral surface of the spherical opening formed by the semi-spherical housing portion 50' and 53, and the frictional engagement of the valve-operating member 55 biased by the spring-biasing means 77 also serves to maintain the operating handle 63 in any of the operating positions thereof. The spring-biasing means 77 also serves to bias the valves for the passageways 26 and 27 in the closed position of the valve to prevent any leakage of fluids from passageways, and also serves to bias each of the valves in their closed position when the other valve is in the control position. The construction of the valves and linkage means connecting the valves to the valve-operating member 55 will now be described with reference to Figs. 1, 2 and 4.

Each flow opening 87 of the passageways 26 and 27 is controlled by similar valve closure means 88 and 89. Since each of these valve closure means is identical, only one will be described and this will be that for the hot water passage 26, as shown in Figs. 1, 2 and 4. Each passageway 26 and 27 has mounted therein a combined flow-control member and gasket support 90. The flow-control portion is cylindrical in form and complemental to the passageways 26 and 27. This member has three flutes 91 symmetrically arranged and with the inner end having the larger end tapering inwardly to a smaller chord diameter. In the particular embodiment shown, the inner chord is substantially $5/16''$ and the outer chord is substantially $3/16''$, and the diameter of the flow-control member is substantially ⅞₆″. Integrally formed with the flow-control member is a knurled annular disc 92 for receiving an annular disc washer 93 formed from rubber or other suitable sealing material such as neoprene and the like. The hole of the annular washer 93 is complementally formed to tightly fit a reduced portion 94 of lesser diameter than the flow-control member 90, as shown in Fig. 4. The flow-control member and gasket support 90 is formed with a drilled and tapped threaded hole to complementally receive a threaded end 95 of a universal linkage 96 which operatively connects the flow-control member and gasket support 90 to the valve-operating member 55. The lock nut 97 secures the flow-control member and gasket support 90 in its adjusted position on the universal linkage 96.

In order to permit the connection of the linkage 96 from the flow-control member 90 to the valve-operating member 55, a drilled passageway 98 extends from the semi-spherical opening 50 inwardly as shown in Figs. 2 and 4, and extends to the inner face of the spout housing 34 by a smaller drilled passageway 99 which is complementally formed to the outer diameter of the universal linkage rod 100. In order to seal the linkage rod 100 to prevent fluid from leaking from the mixing chamber 28 into the spherical chamber of the valve-operating member 55, an enlarged passageway 101 is provided which is suitably threaded to receive a complementally formed threaded packing nut 102, to suitably compress a rubber or neoprene annular gasket 103 to seal the peripheral surface of the universal linkage rod 100 and yet permit the linkage rod 100 to slide freely therethrough. The annular threaded packing nut may be provided with two diametrically opposite drilled holes (not shown) to take a suitable wrench for detaching and attaching the packing nut 102 in place for repair and replacement of the gasket 103.

The universal linkage mechanism 96 includes the linkage rod 100 which extends through the mixing chamber 28 and into the passageway 98 to where it is universally coupled to another linkage rod 104 which extends from the linkage rod 100 to the valve-operating member 55. The linkage rod 100 is threaded at the inner end at 95 for connection to the flow-control member 90 as described above. At its outer end it is formed with a spherical end 105, Fig. 4, and this is oppositely connected with linkage rod 104 having a complementally formed spherical socket member 106. This spherical socket member 106 is preferably formed integrally with the linkage rod 104, and is provided with a substantially completed spherical socket for receiving the spherical wall or end 105 of the linkage rod 100. The end of the spherical socket member 106 may be spun over sufficiently to retain the spherical end 105 within its complementally formed spherical socket member 106. Clearance is provided at the end of the linkage rod 100 to permit angular movement of the linkage rod 104 in any angular position with respect to the slidable linkage rod 100 from its full closed to full open position or intermediate position.

The outer end of the linkage rod 106 is formed with a spherical ball 107 to provide for universal adjustment at its connection with the valve-operating member 55. The valve-operating member 55 is provided with a complementally formed opening 108 formed in a face 109 of the valve-operating member 55. In order to provide the opening 108 for the ball and socket joint 107—108, a hole 110 is drilled at an angle to the face 111 of the member 55 and suitably tapped after the socket connection 108 has been formed to threadably receive a threaded nut 112 having a complementally formed cavity 113 complemental to the spherical surface of the ball 107. The threaded nut 112 is formed with a socket opening 114 to take a wrench to adjust the nut to complete the ball and socket joint. A similarly formed nut 115 is also provided with a similarly formed socket opening 114 for a wrench and this nut is used to lock the nut 112 in its adjusted position. With this ball and socket joint, the valve-operating member 55 may be universally adjusted in all of its adjusted positions.

In order to provide suitable clearance for the linkage rod 100 of the linkage means 96, the valve-operating member 55 for each of the valve closure means 88 and 89 is formed with a recess 116 and 117, Figs. 1, 2 and 4. On the face of the substantially spherical member 55, a spherical triangle is formed and the material moved along the legs 118, 119 and 120 of the spherical triangle. The sides of the recess or planes therethrough 109, 121 are at an angle greater than 90° as shown in Fig. 4, but are perpendicular to the third side 122 of the recess. These recesses 116 and 117 of this spherical member 55 give full clearance to the universal linkage 96 for each of the passageways in any position of the operating handle 63 in the closed position as shown in Fig. 4, to the maximum full open position for the cold water and maximum full open position for the hot water, as shown by the adjustment permitted by the spherical triangular opening 67, Fig. 3.

It is also possible to provide a modified ball and socket construction, for example, by having a plate on the face 109 forming a socket to receive the ball 107 and the plate being held in place on the face 109 by suitable securing means. Similarly, it is also possible to provide a modified spherical socket member 106, which instead of being formed integral with the linkage rod 104 may be formed separately and threadably affixed to the end of the linkage rod 104.

Although it is preferred to construct the bathtub mixing valve of Figs. 1, 2, 3 and 4, as shown in the two separate main parts, the mixing body portion 23 and its passageway, and the spout housing 34 and its associated passageway in this particular instance with the discharge spout 35 integral with the spout housing, it is also within the scope of the invention that the bathtub mixing faucet may be constructed in three parts, for example, with the separate discharge spout, a separate casting for the valve-operating mechanism and a third casting including the mixing chambers and openings corresponding to the passageway 101 for supporting the universal linkage mechanism. With the preferred construction, as shown, the spout housing 34 is detachably assembled on the main body portion 23 by four elongated set screws 123 formed with an "Allen" wrench socket opening 124. The elongated set screws 123 have an elongated shoulder portion 125, and both the spout housing 34 and main body portion 23 are complementally formed thereto as shown in Figs. 1 and 3. The set screws 123 are provided with an elongated threaded portion 126 complementally formed to a threaded opening 127 in the body portion 23. Upon removal of these four set screws 123, the valve seats provided at the flow openings 87 may be readily inspected as may be the annular washers 93 therefor. Also the flow-control members may be inspected and if necessary the rubber or neoprene gaskets 103 may be inspected and replaced. Likewise, the valve member 40 and its gasket 43 for the shower head may be inspected. While the valve operating mechanism is removed in this manner, it is further possible to disassemble the semi-spherical housing 53 from the semi-spherical housing 50′ by the detachment of the set screws 58, whereupon it is possible to inspect the universal linkage mechanism, and the ball and socket mechanism as well as the spring-biasing means 77. The members may be assembled in the reverse order.

A bathtub mixing faucet of this type is usually not mounted on the bathtub but is assembled above the bathtub and extends through the wall where it is connected to the hot and cold water pipes 21 and 22. In order to securely mount the bathtub faucet in position and also to support the piping 31 for the shower head, lugs 128 and 129 are provided for affixing to suitable framing of the wall contiguous to the bathtub faucet and are provided with holes 130 for mounting suitable securing means to extend through the openings into studding or other framework. With this improved construction, it is possible to assemble the bathtub faucet in position so that the piping 21 and 22 is mounted within the studding of the wall contiguous to the bathtub and with substantially one-half or three-quarters of an inch to the left of the juncture of the spout housing 34 and main body portion 23 protruding so that suitable tiling or other surfacing may be applied to the wall for a recessed bathtub or the like.

It is also preferred to make all parts, such as a valve-operating member 55, the spring-biasing means except for the spring though this may be made of bronze, the flow-control member and all of the lock nuts which may come in contact with the fluid to be mixed, from non-corrodible material such as brass and preferably from solid brass rods or castings which may then be suitably machined. It is also within the scope of the invention that certain parts may be suitably die-cast and also formed from suitable sintered powdered metal to reduce the cost of the mixing valve construction. All of the exterior parts are suitably nickel-plated and a protective coating of chrome plate may be applied as desired to complete the ornamental appearance of the bathtub fixture. Other modifications of material and structure may occur to those skilled in the art without departing from the scope of the invention.

Figures 5, 6, 7, 8:
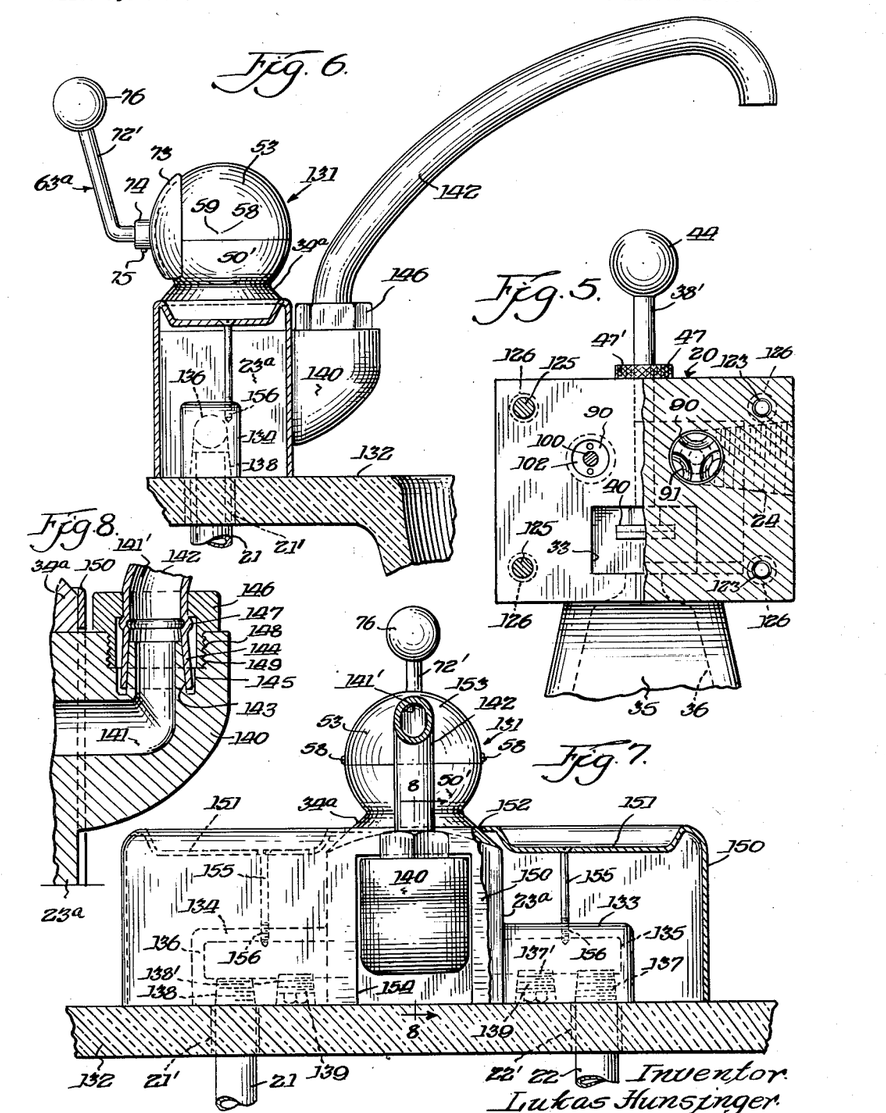
Fig. 5 is an end view, partly in elevation taken along line 5—5 looking in the direction of the arrows and partly in cross-section of the mixing valve of Fig. 1.
Fig. 6 is a view in elevation, partly in section of still another embodiment of my invention of a mixing faucet for use with a kitchen sink.
Fig. 7 is a front view in elevation, partly in cross-section of the mixing faucet of Fig. 6 for kitchen sinks.
Fig. 8 is a view in elevation of a swivel connection of the spigot to the mixing faucet taken along line 8—8 of Fig. 7.

Referring to Figs. 6, 7 and 8 there will be described a preferred embodiment of my invention for a mixing valve and faucet of this type modified for use with a kitchen sink which may be of either a single or double basin type. This embodiment 131 of the mixing valve and faucet is operatively connected to a sink 132 and attached to a hot water supply pipe 21 and a cold water supply pipe 22 extending through suitable holes 21' and 22' of the structure 132. The modified mixing faucet 131 similarly comprises a main body portion 23a having laterally extending right and left hand integrally formed portions 133 and 134 in which are cored similarly formed horizontal passageways 135 and 136 for cold and hot water, respectively. The integrally formed portions 133 and 134 have similarly arranged passages 137, 137', and 138 and 138' which are suitably drilled and tapped for ½" pipe threads. The pipes 21 and 22 are connected respectively to the threaded openings 138 and 137, and the inner threaded openings 138' and 137' are plugged with ½" pipe plug 139. The inner openings 137' and 138' are spaced four inches apart, whereas the outer openings 137 and 138 are preferably spaced 6" apart. This mixing faucet is formed in this manner to accommodate the various hole spacings of conventional kitchen sinks. If there should be other spacings, the integrally formed portions 133 and 134 may be so formed as to take wider spacings if necessary. It is preferable to form the body portion 23a and the integral lateral portions 133 and 134 from cast brass or other suitable ferrous or non-ferrous metal which would not be subjected to corrosion by the fluids being dispensed therefrom.

In this embodiment a spout housing 140 is also preferably integrally formed with the main body portion. It is also within the scope of the invention that this portion may be separately cast and suitably affixed as is well known in the art but in order to reduce the cost it is preferable to integrally form the spout housing 140 as illustrated in Figs. 7 and 8, and there may be suitably cored therein a passageway 141 connected to a mixing chamber 28 (not shown) similar to the mixing chamber 28 of the embodiment of the mixing faucet of Fig. 1. Otherwise, the construction of the main body portion 23a is similar to the construction described with reference to the embodiment of Fig. 1. The passageways 135 and 136 are similarly arranged to the passageways 25 and 24 of the embodiment of Fig. 2, and are connected to similarly formed drilled passageways 27 and 26, also as illustrated in Fig. 2. In this manner the holes are directed to the mixing chamber 28 which are then controlled by the valve closure means 88 and 89 as similarly described with reference to Figs. 2 and 4. Therefore, further description of these members is believed unnecessary with respect to this embodiment.

A discharge spout 142 is operatively connected to the passage 141 and is so mounted as to permit swivelling of the spout to discharge water anywhere within a single basin or into both basins of a twin-basin kitchen sink. Referring to Figs. 6 and 8, the swivel connection is provided by forming a cone-shaped member 143 at the outer end of the discharge passage 141, and the discharge spout 142 at its lower end is formed with a complementally formed conical-shaped member 144 to that of the cone-shaped member 143, as shown in Fig. 8. An annular recess 145 is formed to swivelly mount therein the lower end of the cone-shaped member 144. To detachably mount the discharge spout 142 and permit swivelling thereof, a nut 146 complementally formed with an opening to swivelly receive the lower end of the discharge spout in its assembled position abuts an annular ridge 147, and the threads 148 of the nut are complementally received within a threaded opening 149. As viewed in Fig. 8, the fluid whether hot, cold or blended is discharged through the passageway 141 directly into an opening 141' extending through the discharge spout.

The valve-operating mechanism, Fig. 6 and Fig. 7, is similar to the valve operating mechanism described with reference to Figs. 1, 2 and 4, with the exception that the housing therefor 34a, Figs. 6 and 7, is positioned vertically rather than horizontally as compared to the spout housing casting 34 of Fig. 1. Also the spout housing 140 is integrally formed with the main body portion 23a rather than being connected to the housing 34a as described with reference to the construction of the spout 35 integrally formed with a spout housing 34 of Fig. 1. Other than this, the construction of the valve operating member 55, the spherical housing 50' and 53, the spring-biasing means 77 and other features of the universal linkage and packing members and washers are described with respect to Fig. 1, are identical and need not be further described. Also identically constructed to the housing member 73, and the only difference is in the shape of the operating handle 63a from that of the operating handle 63 of Fig. 1. As shown in Fig. 6, this operating handle is combined as shown since it is positioned to the rear in the assembly as shown in Fig. 6 rather than at the top as shown in Fig. 1. This change is due to the 90° change in position in the embodiment of Fig. 6 from that of Fig. 1. As the assembly and disassembly of the mixing faucet of Fig. 6 is identical to that of Fig. 1, further description of this modified form of mixing faucet is believed unnecessary. It is also evident that further modifications may be made by one skilled in the art without departing from the scope of the invention.

In order to provide additional ornamentation for the mixing faucet for the sink and to furnish twin soap dishes, an ornamental housing 150 is provided preferably formed from sheet metal and suitably plated is provided with similarly positioned soap dishes 151. As viewed in Figs. 6, 7 and 8, it is complementally shaped to the periphery of the housing 23a and 34a to substantially enclose the mixing faucet as shown in section in Fig. 6 and Fig. 7. In order that the ornamental housing 150 may be readily removed, the circular opening 152 is provided and is such a size to be detached over the spherical enclosure 153 formed by the semi-spherical housing 50' and 53. A rectangular recess or slot 154 complementally formed to the sides of the sides of the spout housing 140 permits the ornamental housing 150 to be properly positioned. The ornamental housing is secured in position with respect to the mixing faucet by countersunk machine screws 155 extending through complementally formed countersunk holes in the soap trays 151, and in threaded engagement at their lower ends with complementally formed threaded holes 156 of the laterally extending portions 133 and 134, Figs. 6 and 7. It is preferred that a suitable heavy plating of nickel and chrome shall be applied to the ornamental housing 152 to withstand the detergents in the soaps and other corrodible fluids encountered in the kitchen. It is also preferred to form the housing 150 from sheet brass or other non-corroding metal and it might be either press formed or die cast as is well understood in the art.

Figure 9:
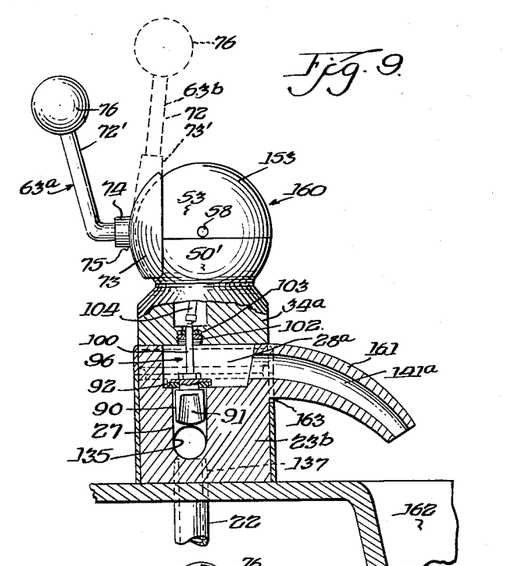
Fig. 9 is a view in elevation, partly in cross-section of another embodiment of my invention of a mixing faucet for a lavatory.
Figure 10:
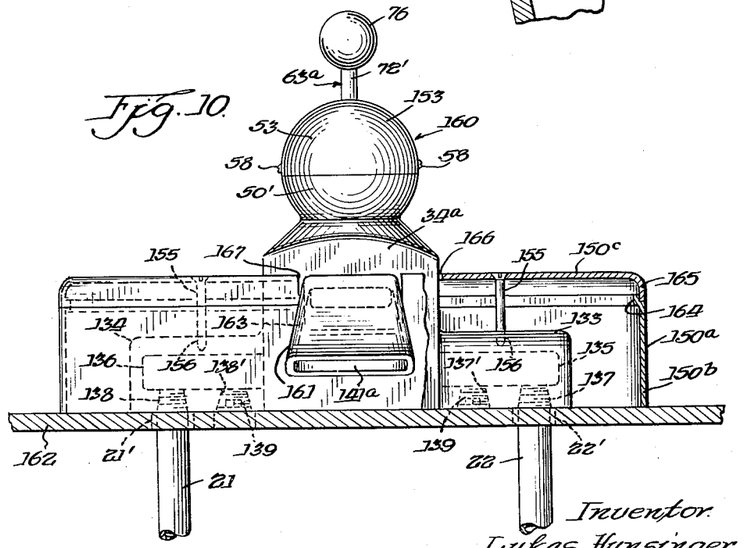
Fig. 10 is a front view in elevation, partly in cross-section, of the mixing faucet of Fig. 9.

Referring to Figs. 9 and 10, there is illustrated another embodiment 160 of my invention illustrating a preferred form of the mixing faucet of this invention adapted for use with bathroom lavatories. This mixing faucet primarily used for bathroom lavatories is similar to the previously described embodiments of Figs. 1 through 5, and also of Figs. 6 through 8, the only modification being in the main body portion 23b wherein a modified down spout 161, shaped as illustrated in Figs. 9 and 10, is integrally cast with the main body portion 23b since there is no need for a swivelling spout as in the kitchen sink embodiment of Figs. 6 through 8. The spout 161 is provided with a discharge passage 141a corresponding to the passage 141 of Fig. 8 which in turn is connected to the modified mixing chamber 28a. The housing portion 23b as similarly formed right and left hand integrally formed portions 133 and 134 which are provided with similar cored passageways 135 and 136 as the embodiment of Fig. 7. Likewise, similarly formed threaded openings 137 and 137' are operatively connected to the cored passageway 135, and the threaded openings 138 and 138' are operatively connected to the cored passageway 136. The openings 137' and 137' in this instance have secured therein the detachable ½" pipe plugs 139, as all of these openings 137, 137', 138 and 138' are drilled and tapped for ½" pipe fittings. The openings 137 and 138 are connected respectively to the cold water piping 22 and hot water piping 21 which extends through openings 22' and 21' of the lavatory 162.

The housing 34a is similarly formed as the housing 34a of Fig. 6 and also is similar with respect to the valve operating means 55, the spring-biasing means 77 and universal linkage 96 for actuating the valve from the valve-operating member 55. The only difference between this embodiment and in the embodiment of Fig. 6 is that the spout constructions therefor are operatively connected to the mixing chamber 28a directly rather than a suitably valve-controlled passage in the spout housing 34 of the embodiment of Fig. 1. Therefore, like reference characters will indicate the same or similar parts and further description of the valve operating means is unnecessary as it has been fully described with reference to the construction of Figs. 1, 2, 3, 4 and 5. In the cross-sectional view of Fig. 9 there is illustrated the universal linkage mechanism 96 including the linkage rods 100, 104, the annular disc washer 92, the flow-control member 90, the packing nut 102 and gasket 103 similar to the construction as described with reference to Fig. 4 of the bathtub mixing faucet of the embodiment of Figs. 1 through 5. The spherical enclosure 153 for the valve operating mechanism or member 55, its associated parts, is likewise of the same construction as that described with reference to Fig. 4 and need not be further described. The operating handle 63a is the same as is the enclosure for housing member 74, the spherical triangular openings 67 permits the adjusting of the operating handle in any of its operating positions.

In Fig. 9 there is illustrated a modified operating handle arrangement 63b which includes the same spindle 72 as an embodiment of Fig. 1 but the housing member 63 is modified to the dotted portion 73' in order that the handle 63b may be in a somewhat more vertical position to clear the wall back of the lavatory if the lavatory is provided only with small clearance between the entrance of the piping and the wall from the back face of the lavatory (not shown). However, in this modified handle arrangement, it would still be necessary to use a short stud in place of the spindle 72' extending to the outer end of the collar 74 so that the housing member 73' may be affixed to this shortened stud which would be comparable to the lower end of the spindle 72 of Fig. 1, and would include the threaded end 64 and extend to the upper end of the collar 74 of Fig. 1. A modified ornamental housing 150a may be provided in place of the housing 150 provided with soap trays 151. However, the ornamental housing 150 may likewise be substituted for the housing 150a if desired. In this embodiment of the housing 150a, an ornamental base member 150b is provided with a recess 163 to clear the downspout 161. The base 150a is provided with a peripheral lip construction 164 to complementally receive the downturned edge 165 of an ornamental cover 150c and the cover is provided with an opening 166 with a notch 167 to complementally receive the housing 34a and the upper part of the spout 161. This modified ornamental housing 150a may be formed from sheet metal or die cast metal suitably plated and polished. The ornamental housing 150a is affixed in place by the countersunk machine screws 155 in threaded engagement with the complementally threaded holes 156 and the laterally extending portions 133 and 134.

Figure 11:
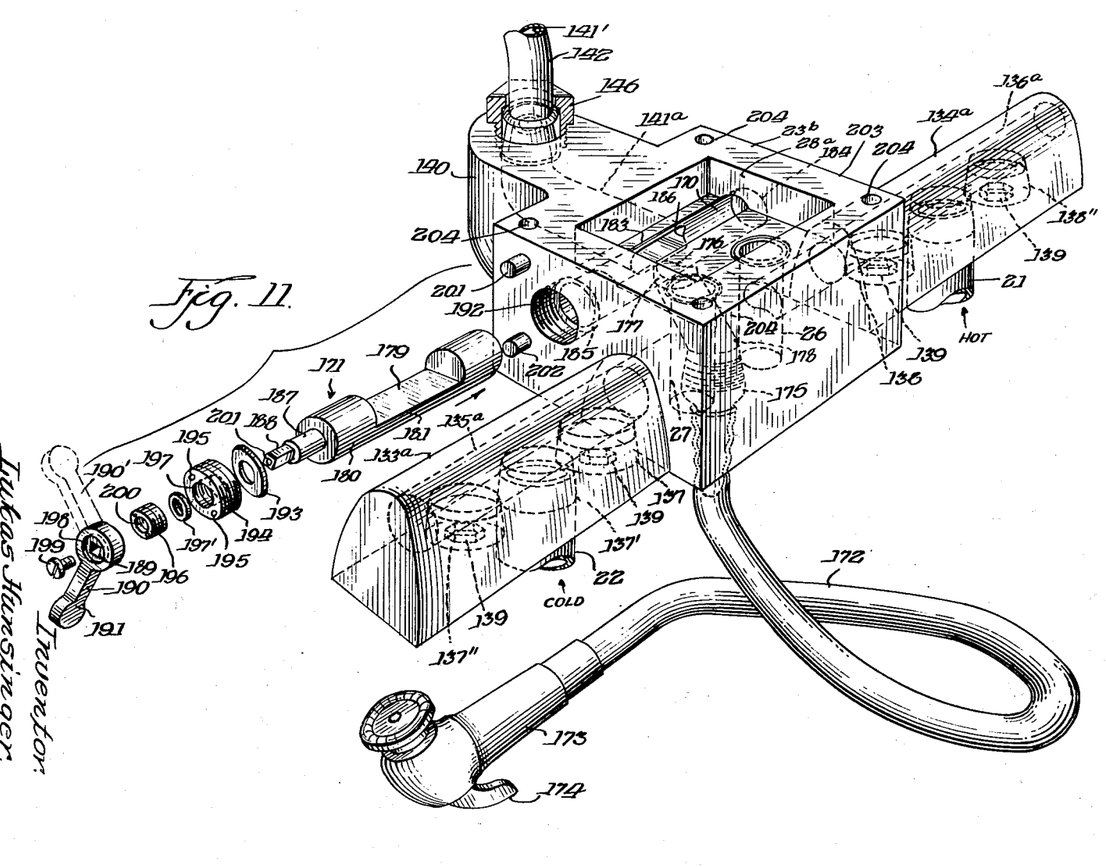
Fig. 11 is a perspective view of a mixing faucet for a kitchen sink illustrating the valve mechanism exploded for controlling the flow of the fluid to the sprayer used in connection with the mixing faucet, and with the valve mechanism for controlling the two fluids removed but which is similar to the valve operating mechanism of Figs. 9 and 10.

Referring to Figs. 11, 12, 13, 14 and 15, another embodiment of my invention for an improved mixing faucet for use with either a single basin or twin basin kitchen sink and which also has operatively connected thereto a spray nozzle for spraying dishes and the like, together with a control valve for shifting the discharge of hot, cold or the blended mixture of water or the like fluid directly to the discharge spout into the sink or to the spray nozzle as desired. The principal features of construction, such as the valve-actuating mechanism and the like for the control of the fluids from the hot and cold water passageways, is identical as described with reference to the embodiment of Figs. 6, 7, and 8, and also as particularly described with reference to the embodiment of Figs. 1 through 5 for a bathtub mixing faucet, and also the controls are the same as described with reference to Figs. 9 and 10 for the lavatory faucets. Since the controls are identical as previously described, these Figures 12 through 15 inclusive, only illustrate the modified body portion which comprises the modification of the body portion 23b to receive the spray hose connection and also the modified valve construction for controlling the discharge to the spout and to the spray nozzle. The valve-operating mechanism and associated mechanism have been detached to better show the passages for the spray nozzle as shown in the exploded portion of Fig. 11. The main housing portion 23b has integrally formed laterally extending portions 133a and 134a corresponding to these integrally formed portions 133 and 134 described with reference to the embodiments of Figs. 6, 7, 8, 9 and 10. However, in this later embodiment of Fig. 11, these integral laterally extending portions are longer to accommodate a third center spacing. Whereas, the embodiments of Figs. 6 and 10, accommodate an axial spacing 4" and 6" centers for hot and cold water piping, the embodiment of Fig. 11 is adapted to accommodate the three center spacings of 4", 6" and 8". Therefore, in addition to the previously described threaded openings 137, 137' extending into the cored passageway 135a, there is a third passageway 137". Also in addition to the threaded passageways 138, 138' extending into the elongated passageway 135a, there is a third drilled and tapped opening 138". It is preferred that all of these openings be threaded for ½" pipe thread, though it is to be understood that other size openings may be provided as desired without departing from the scope of the invention. The horizontal laterally extending passageways may be cored or drilled and if drilled, the ends thereof would have to be plugged as is well understood in the art.

As in the other embodiments, the passageways 137' and 138' are connected to the cold and hot water supply pipes 22 and 21, respectively, and the other openings 137 and 137", and 138 and 138" of this embodiment are closed by ½" pipe plugs 139. In the arrangement as described, the supply pipes 22 and 21 are on 8" centers, and this corresponds to holes on 8" centers of the cabinet-type kitchen sink tops.

The passageways 135a and 136a extend through the housing 23b and to the vertically drilled passageways 27 and 26, respectively which are operatively connected to the mixing chamber 28a.

In order to discharge the water from the hot and cold pipes 21 and 22 from the mixing chamber 28, a valve chamber 170 extends downwardly to accommodate a control valve 171 for a spray hose 172. The valve mechanism 171 and spray hose connection will be described later. A discharge passageway 141a connects the valve chamber 170 to the swivelled discharge spout 142 through its passageway 141' therein. This passageway 141a and the swivel discharge spout 142 are similar to the embodiment described in Figs. 6, 7 and 8, only that the passageway 141a is lower than the passageway 141 in Fig. 8 in order to accommodate the connection to the valve chamber 170. In all other respects, the connection is the same and therefore reference is made to Fig. 8 for the details of the swivel construction which is clearly shown in cross-section, whereas in the embodiment as shown in Fig. 11, it is dotted in with the exception of the hexagonal locking nut 146 which retains the discharge spout in its operative position on the spout housing 140 which is operatively connected by a continuation of the opening 141a, as shown in Fig. 8. The swivel discharge spout 142 is operative to discharge in any angular position with respect to a single basin or twin basin sink.

In order to operatively connect a spray hose 172 including a spray nozzle 173 and a thumb control valve 174, the spray hose 172 is connected to a ½" threaded pipe opening 175, the spray hose 172 having a suitable ½" fitting affixed thereto to be connected in the threaded opening 175. The discharge from the mixing chamber 28a discharges through a port 176 operatively connected to the bottom of the valve chamber 170 and located forwardly of the two vertical passageways 26 and 27 and intermediate the axes thereof. The openings to the passageways 26 and 27 are in the bottom face of the mixing chamber 28a. From the port 170, the passageway 177 extends downwardly a slight distance and thereafter enters an inclined passageway 178. These passageways 177, 178 and 175 are preferably suitably cored and cast within the housing 23b. However, the passageway 175 is suitably drilled and tapped afterwards to provide suitable threads. It is to be understood that these passageways can be suitably drilled but when drilled it will probably be necessary to plug part of the drilling which may extend to one of the faces of the housing 23b as is well understood in the art.

Figures 12, 13, 14, 15:
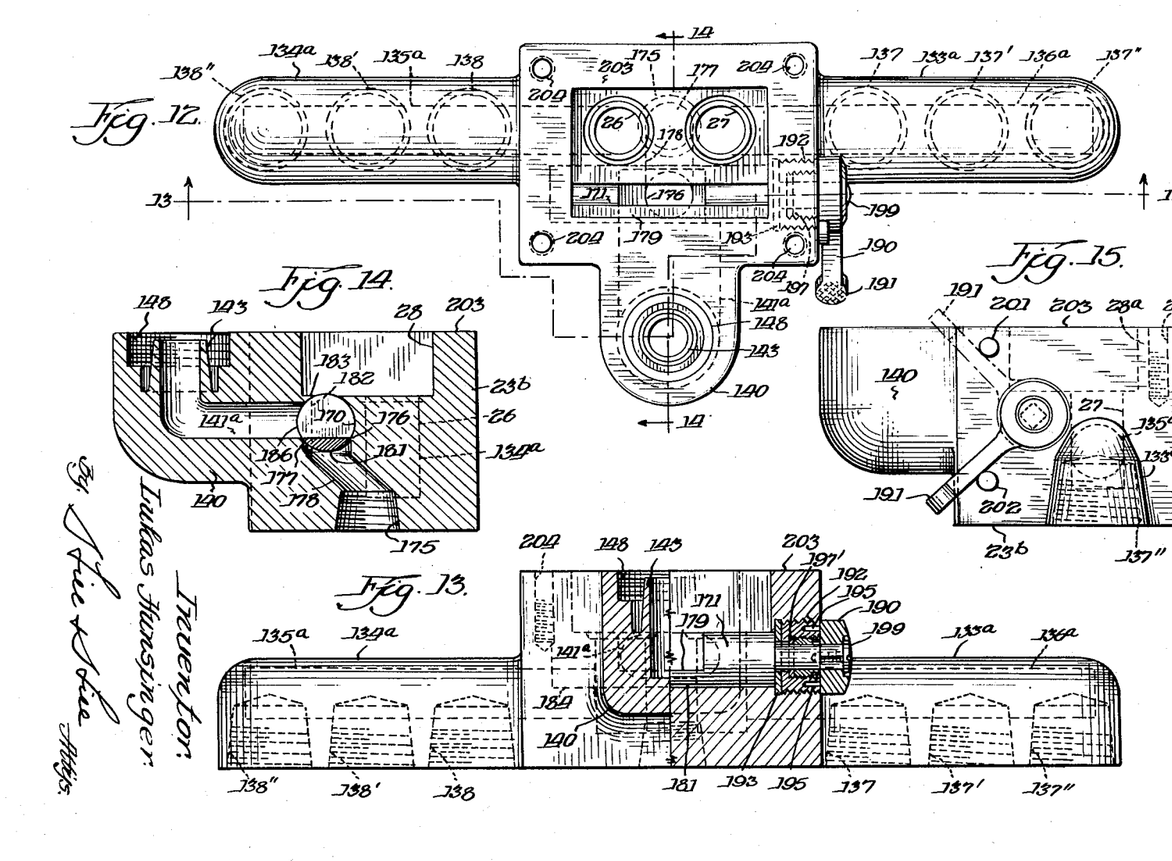
Fig. 12 is a plan view, partly in section, with the valve mechanism of the mixing faucet removed of the combined mixing faucet and sprayer of Fig. 11.
Fig. 13 is a front view in elevation, partly in cross-section, taken along line 13—13 of Fig. 12 of the housing casting of mixing faucet of Fig. 11, and with the valve operating mechanism for blending the fluids removed.
Fig. 14 is an end view, partly in section, taken along line 14—14 of Fig. 12, and illustrating the fluid passages for the faucet and for the sprayer connection.
Fig. 15 is an end view of the mixing faucet of Fig. 11, illustrating the valve operating mechanism for controlling the fluid mixture to the spray nozzle or the mixing faucet.

In view of the passageways provided in the lateral extensions 133a and 134a and in the housing 23b, cold and hot water may enter the passageways 133a and 134a and discharge through the vertical passageways 27 and 26 to the mixing chamber 28a. With the control valve 171 as shown in Figs. 12, 13 and 14 and also in the exploded position thereof, Fig. 11, the hot or cold discharge thereof can be discharged through the valve chamber 170 in view of the recessed portion 179 and the valve 180, and out through the passageway 141a through the passageway 141' of the discharge spout to the sink. The lower portion of the valve 180 which is semi-cylindrical portion 181, completely shuts off the discharge of hot or cold water or a mixture thereof, from the chamber 28a through the port 176 and the passageways 177, 178 and 175 to the spray hose 172. With the valve rotated substantially 90° to the dotted position as shown at 182, the hot or cold water or blended mixture thereof, is discharged from the mixing chamber 28a though the opening provided by the recessed portion 179 through the valve 180 through the passages 177, 178 and 175, and out through the holes 172 where the spray is controlled by the thumb valve 174 of the spray nozzle 173. Upon actuation of the thumb control, dishes and the like may be suitably sprayed with the hot, cold or blended mixture.

Referring to Fig. 11, the particular control valve 161 will be described with reference to the exploded view thereof. The valve chamber 170 which is in communication with the mixing chamber 28a has a somewhat rectangular opening 183, Fig. 12, which is formed by the intersection of the passageways 184 and 185 for the reception of the cylindrical end of the cylindrical valve 180 and the plane of the bottom of the mixing chamber 28a. The valve chamber 170 is also in communication with the passageway 141a for the discharge of the fluid to the discharge valve, and is also in communication with the port 176 formed by the juncture of the passageway 177 and the valve chamber 170, and is for the discharge of the fluid to spray nozzle 173. The cylindrical valve 180 is formed with a recess portion 179 which when properly rotated permits discharge of fluids from the mixing chamber 28a to the discharge spout 142 and in a position 90° therefrom, as shown in Fig. 14 in the dotted position thereof from its discharge of the fluids from the mixing chamber 28a to the spray nozzle 173. With the semi-cylindrical portion 181 in the solid position as shown in Fig. 14, the passageway or port 176 is closed so that the fluid from the mixing chamber 28a is discharged only to the discharge spout 142 through the passageway 141a. With the semi-cylindrical portion 181 in the dotted position, as shown in Fig. 14, the mixing chamber discharges fluids only to the spray hose 172 through the port 176; the opening 186 to the passageway 141a of the discharge spout being closed.

The cylindrical valve 180 is formed with a spindle 187 and the end of the spindle is formed with a squared, or knurled end or the like 188 which extends into a complementally formed square opening 189 of an operating lever 190. The operating lever 190 is formed with a suitably serrated flattened portion on both sides 191 for engagement with the operator's thumb and forefinger for the operation of the control valve 171.

In order to assemble the cylindrical valve 180, the valve is inserted within the valve chamber 170 by inserting the valve 180 through the outer passageway 185 until the inner end of the cylindrical valve 180 is suitably journaled within the inner passageway 184. The spindle 187 extends through the threaded opening 192 with a squared end 188 extending beyond the face of the main body portion 23 to receive the operating lever 190. If desired, a suitable rubber or neoprene gasket 193 may be placed over the spindle 187 to stop any leakage of fluid about the peripheral surface of the valve 180. The gasket 193 is suitably held in position by a threaded nut 194 complementally formed to the threaded opening 192 and may be suitably tightened in position by a wrench engaging the drilled holes 195. The threads of this nut are preferably ¾" sixteen threads per inch. In order to additionally prevent any leakage about the stem 187, a similarly formed nut 196 is complementally threaded to the complementally formed opening 197. If desired, a suitable gasket may be inserted to prevent any leakage of fluid about the spindle 187. After the cylindrical valve 180 and its associated securing means have been positioned within the associated valve chamber 170 and threaded opening 192, the operating lever 190 is positioned as shown in the dotted lines so that the squared end 188 is mounted within the complemental opening 189, A recessed opening 198 is complementally formed to the head of a securing means 199, and upon affixing the threaded end of the securing means through a complementally formed threaded opening 200 formed in the squared end 188 of the spindle, the operating lever is properly secured in place. Upper and lower stops 201 and 202 are located as shown in Figs. 11, 13 and 15, and with the operating lever 190 engaging the lower stop 202, the discharge of fluids from the mixing chamber 28a is only through the discharge spout 142. Upon raising the operating lever to the dotted position as shown in Figs. 11 and 15, fluids from the mixing chamber 28a are discharged only to the spray hose 172, and upon operation of the thumb control 174 of the spray nozzle 173, the discharged fluid may be sprayed where desired.

As stated previously, the associated valve-control mechanism including the housing therefor, as described with reference to Figs. 9 and 10, Figs. 6 and 7, and Figs. 1, 2 and 4 as used to control the passageways 26 and 27, and the housing 34a and its associated mechanism, as illustrated in Fig. 9 is assembled in position on the upper face 203 of the main body portion 23b and is suitably secured in position by the elongated set screws 123 as shown in Fig. 1, mounted in the openings 204. Thereupon, by the manipulation of the operating handle 63a; hot, cold or blended fluid may be discharged through the spout 142 or to the spray hose 172 depending upon the setting of the operating lever 190 of the control valve 171 for controlling the discharge of the hot, cold or blended fluids either to the discharge spout 142 or the spray hose 172.

It is to be understood that the spray hose and spray nozzle 172 are located contiguous to the mixing faucet as is well understood in the art so that the spray hose may be pulled outward or drawn back in, upon release, beneath the sink.

It is also to be understood that the control valve or vertical lift valve 37, as described with reference to Fig. 1, might be suitably modified with a mixing faucet construction of Fig. 11 for controlling the fluid discharged through the discharge spout 142 or to the spray nozzle 172 without departing from the scope of the invention. Other modifications will suggest themselves to one skilled in the art.

If it is desired to have soap trays, the ornamental housing 150 and soap trays 151 of Fig. 7 may be used without departing from the scope of the invention but in the embodiment of Fig. 11, a larger ornamental housing may be required in view of the fact that this embodiment is for use with hot and cold water piping spaced either 4", 6" or 8". Likewise, the ornamental housing 150a of Fig. 10 may be used with suitable allowance for the larger size ornamental housing required in the embodiment of Fig. 11 than in Fig. 10.

It is also to be understood that it is within the scope of the invention that all parts subject to corrosion may be made of suitable cast brass parts, or die cast from suitable sintered metal to further reduce the cost. Also, all of the ornamental surfaces are to be suitably copper and chrome plated to provide for a highly ornamental fixture for the parts of the mixing faucet which are exposed.

From the foregoing description, it is obvious that there have been disclosed several embodiments of improved faucet construction for use either as a fixture for a bathtub, a lavatory, a kitchen sink and which also may be used with a shower head for a bathtub, and also with spray heads as an attachment for kitchen faucets. These embodiments of the various mixing faucets may be simply and economically fabricated and are readily disassembled for repair and replacement of parts. In addition, a minimum of parts are required for modifying certain faucet parts thereof into the various embodiments which have been described.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A mixing valve comprising a main body portion formed with a mixing chamber operatively connected to passageways, said passageways being adapted for connection to respectively hot and cold water lines, a discharge spout connected to the mixing chamber, valve means operatively associated with said mixing chamber for controlling the aforesaid passageways for hot and cold water discharge to the mixing chamber, a spherical socket housing operatively associated with said main body portion, said valve means operatively mounted within said spherical socket housing and including a valve-operating member, disc valve means for closing each of said first-mentioned passageways, universal linkage means for each of said disc valve means pivotally connected at one end to said disc valve means and pivotally connected at the other end to said valve-operating member, said universal linkage means including linkage rods universally connected together for angular and longitudinal movement, means for universally mounting said valve-operating member for operating said disc valve means for closing each of said first-mentioned passageways and opening one or the other of said first-mentioned passageways and for intermediate opening of said passageways for blending the mixture of hot and cold fluids within said mixing chamber, operator-operated means operatively connected to said valve-operating member for actuating said valve-operating member within a pre-determined triangular area from full closed at one apex for both of said disc valve means, full open at another apex for the passageway for hot fluid, full open at the third apex for the passageway for cold fluid, and within the triangular area for blending the fluids and along two sides of the triangular area for controlling the respective discharge of the fluid passageways and along the base of the triangle for blending and controlling the amount of mixture discharged.

2. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid socket housing operatively associated with said main body portion, said valve means operatively mounted within said spherical socket housing and including a valve-operating member, disc valve means for closing each of said first-mentioned passageways, universal linkage means for each of said disc valve means pivotally connected at one end to said disc valve means and pivotally connected at the other end to said valve-operating member, means for universally mounting said valve operating member for operating said disc valve means for closing each of said first-mentioned passageways and opening one or the other of said first-mentioned passageways and for intermediate opening of said passageways for blending the mixture of hot and cold fluids within said mixing chambers, operator-operated means operatively connected to said valve-operating member, said valve-operating member operatively mounted within said spherical socket housing for rotation about one axis of the valve-operating member and for rotation about another axis of the valve-operating member at right angles to the first-mentioned axis within a pre-determined angular movement of the valve-operating member about the first-mentioned axis, a triangular opening provided in the aforesaid spherical socket housing for angularly limiting the angular movement of the valve-operating member about each of its axes intersecting at right angles thereto at substantially the center of the aforesaid spherical socket housing, said valve-operating member complementally formed to a spherical chamber within said spherical socket housing, and spring-biasing means operatively engaging the spherical surface of the spherical socket housing and the valve-operating member for biasing the disc valve means in their closed position and for operatively maintaining the operator-operated means in any of its adjusted positions.

3. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid inlet passageways to the mixing chamber, a spherical socket housing operatively associated with said main body portion, said valve means operatively mounted within said spherical socket housing and including a valve operating member, disc valve means for closing each of said first-mentioned passageways, universal linkage means operatively connecting said disc valve means and said valve operating member, means for universally mounting said valve operating member for operating said disc valve means for closing each of said first-mentioned passageways and opening one or the other of said first-mentioned passageways and for intermediate opening of said passageways for blending the mixture of hot and cold fluids within said mixing chamber, operator-operated means operatively connected to said valve-operating member, said valve-operating member operatively mounted within said spherical socket housing for rotation about one axis of the valve-operating member and for rotation about another axis of the valve-operating member at right angles to the first-mentioned axis within a predetermined angular movement of the valve-operating member about the first-mentioned axis, a triangular opening provided in the aforesaid spherical socket housing for angularly limiting the angular movement of the valve-operating member about each of its axes intersecting at right angles thereto at substantially the center of the aforesaid spherical socket housing, said universal linkage means comprising a linkage rod operatively connected to the disc valve means permitting rotation of the disc valve means about the longitudinal axis of the universal linkage rod, another universal linkage rod operatively connected to the first-mentioned universal linkage rod and to the valve-operating member, a universal connection operatively connecting the two universal linkage rods together, permitting angular relative movement of the universal linkage rod with respect to each other and rotation of the linkage rods with respect to each other, a complementally formed universal connection between the outer end of the second-mentioned universal linkage rod and the valve-operating member permitting angular movement and rotational movement between the valve-operating member and the outer end of the second-mentioned universal linkage rod, and means operatively mounted on the spherical socket housing for slidably mounting the first-mentioned universal linkage rod and for sealing the first-mentoned universal linkage rod in the adjusted positions of the disc valve means from full closed to full open position.

4. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid inlet passageways to the mixing chamber, a spherical socket housing operatively associated with said main body portion, said valve means operatively mounted within said spherical socket housing and including a valve operating member, disc valve means for closing each of said first-mentioned passageways, universal linkage means operatively connecting said disc valve means and said valve operating member, means for universally mounting said valve operating member for operating said disc valve means for closing each of said first-mentioned passageways and opening one or the other of said first-mentioned passageways and for intermediate opening of said passageways for blending the mixture of hot and cold fluids within said mixing chamber, operator-operated means operatively connected to said valve-operating member, said valve-operating member operatively mounted within said spherical socket housing for rotation about one axis of the valve-operating member and for rotation about another axis of the valve-operating member at right angles to the first-mentioned axis within a predetermined angular movement of the valve-operating member about the first mentioned axis, and a triangular opening provided in the aforesaid spherical socket housing for angularly limiting the angular movement of the valve-operating member about each of its axes intersecting at right angles thereto at substantially the center of the aforesaid spherical socket housing, universal linkage means for each of said disc valve means, each of said universal linkage means including universal linkage rods intermediately connected together for swivelling movement and angular movement with respect to each other, the outer end of one universal linkage rod operatively affixed to its respective valve means and the outer end of the other universal linkage rods swivelly connected to the valve-operating member, a passageway for the universal linkage means between the mixing chamber and the recess formed in the valve-operating means contiguous to the connection of the universal linkage means to the valve-operating member, means for slidably mounting the first-mentioned universal linkage rod and sealing the passage therefor permitting axial longitudinal movement of the first-mentioned linkage rod, and the outer end of the clearance passageway and the aforesaid recess of the valve-operating member permitting angular movement of the second universal linkage rod with respect to the first-mentioned universal linkage rod and also angular and swivelling movement of the valve-operating member with respect to the second-mentioned universal linkage rod whereby the aforesaid disc valve means may be actuated from full closed to full open and intermediate positions thereof in the angular adjusted position of the valve-operating member upon actuation of the operator-operated means within its predetermined angular positions.

5. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid inlet passageways to the mixing chamber, a spherical socket housing operatively associated with said main body portion, said valve means operatively mounted within said spherical socket housing and including a valve-operating member, disc valve means for closing each of said first-mentioned passageways, universal linkage means operatively connecting said disc valve means and said valve operating member, means for universally mounting said valve-operating member for operating said disc valve means for closing each of said first-mentioned passageways and opening one or the other of said first-mentioned passageways and for intermediate opening of said passageways for blending the mixture of hot and cold fluids within said mixing chamber, operator-operated means operatively connected to said valve-operating member, said valve-operating member operatively mounted within said spherical socket housing for rotation about one axis of the valve-operating member and for rotation about another axis of the valve-operating member at right angles to the first-mentioned axis with a predetermined angular movement of the valve-operating member about the first-mentioned axis, and a triangular opening provided in the aforesaid spherical socket housing for angularly limiting the angular movement of the valve-operating member about each of its axes intersecting at right angles thereto at substantially the center of the aforesaid spherical socket housing, said spherical socket housing including laterally spaced passageways for each of said universal linkage means, said valve-operating member provided with laterally spaced recesses in operative relationship with respect to the aforesaid laterally spaced passageways of the spherical socket housing, a ball formed on the outer end of each of the universal linkage means, complementally formed means formed on the valve-operating member forming a ball and socket joint for each of said universal linkage means contiguous to their respective recesses, means for detachably mounting each of the ball means of the universal linkage means on the valve-operating member, and spring-biasing means operatively mounted within the spherical socket housing and operatively associated with said valve operating member for operatively biasing each of the disc valve means in the closed position thereof and retaining the disc valve means in any of their operative positions from full closed to full open and intermediate positions upon actuation of the operator-operated means.

6. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid inlet passageways to the mixing chamber, a spherical socket housing operatively associated with said main body portion, said valve means operatively mounted within said spherical socket housing and including a valve-operating member, disc valve means for each of said first-mentioned passageways, universal linkage means including pivotally connected linkage rods for operatively connecting said disc valve means and said valve-operating member, means for universally mounting said valve operating member for operating said disc valve means for opening and closing each of said first-mentioned passageways, operator-operated means operatively connected to said valve-operating member, said valve-operating member operatively mounted within said spherical socket housing for rotation about one axis of the valve-operating member and for rotation about another axis of the valve-operating member at right angles to the first-mentioned axis within a predetermined angular movement of the valve-operating member about the first-mentioned axis, and a triangular opening formed on the aforesaid spherical socket housing for angularly limiting the angular movement of the valve-operating member about each of its axes intersecting and at right angles thereto at substantially the center of the aforesaid spherical socket housing, said valve-operating member complementally formed to a spherical chamber within said spherical socket housing, spring-biasing means operatively engaging the spherical surface of the spherical socket housing and the valve-operating member for biasing the disc valve means in their closed position and for operatively maintaining the operator-operated means in any of its adjusted positions, said disc valve means for each of said first-mentioned passageways complementally threaded to adjustably receive a threaded end of said contiguous linkage rod and including a flow-control member operatively mounted in each of said passageways, said flow-control member formed with flutes for diverting the fluid within the mixing chamber upon the opening of the disc valve means, and said flow-control member operatively connected to said disc valve means, and an annular gasket operatively mounted on the disc valve means for sealing the opening of the passageway contiguous thereto to the mixing chamber.

7. A bathtub mixing faucet comprising a main body portion formed with a mixing chamber operatively connected to a plurality of inlet passageways, said passageways being adapted for connection to fluid supply lines, valve means operatively associated with said inlet passageways for fluid discharge to the mixing chamber, a spherical socket housing operatively associated with said main body portion, said valve means operatively mounted within said spherical socket housing and including a valve operating member, disc valve means for closing each of said first-mentioned inlet passageways, flow-control means operatively associated with said disc valve means, said flow-control means operatively mounted in each of said inlet passageways for aligning said disc valve means with respect to the opening of the inlet passageways to the mixing chamber, universal linkage means including pivotally connected linkage rods operatively connected to each of said disc valve means and to said valve-operating member, spring-biasing means operatively mounted within the spherical socket housing and slidably connected between said valve-operating member and said inner periphery of the spherical socket housing for biasing the disc valve means in the closed position of the disc valve means and in any of the adjusted positions thereof between full closed and full opened position, operator-operated means operatively connected to said valve-operating member, a spherical triangular opening formed on the spherical socket housing through which the operator-operated means extend, said spherical triangular opening permitting angular adjustment of the valve-operating member for maintaining the disc valve means in each of their respective open or closed position or intermediate adjusted positions for discharge of fluid from one of said inlet passageways, both of said inlet passageways for the mixture of the fluid discharged from the inlet passageway to the mixing chamber, a discharge spout operatively connected to the mixing chamber for the discharge of fluids from either of said inlet passageways or mixture thereof, said spherical socket housing formed with a recess, and said discharge spout is operatively connected to said recess.

8. A mixing faucet comprising a main body portion formed with a mixing chamber operatively connected to a plurality of inlet passageways, said passageways being adapted for connection to fluid supply lines, valve means operatively associated with said inlet passageways for fluid discharge to the mixing chamber, a spherical socket housing operatively associated with said main body portion, said valve means operatively mounted within said spherical socket housing and including a valve operating member, disc valve means for closing each of said first-mentioned inlet passageways, flow-control means operatively associated with said disc valve means, said flow-control means operatively mounted in each of said inlet passageways for aligning said disc valve means with respect to the opening of the inlet passageways to the mixing chamber, universal linkage means including pivotally connected linkage rods operatively connected to each of said disc valve means and to said valve-operating member, spring-biasing means operatively mounted within the spherical socket housing and slidably connected between said valve-operating member and said inner periphery of the spherical socket housing for biasing the disc valve means in the closed position of the disc valve means and in any of the adjusted positions thereof between full closed and full opened position, operator-operated means operatively connected to said valve-operating member, a spherical triangular opening formed on the spherical socket housing through which the operator-operated means extend, said spherical triangular opening permitting angular adjustment of the valve-operating member for maintaining the disc valve means in each of their respective open or closed position or intermediate adjusted positions for discharge of fluid from one of said inlet passageways, both of said inlet passageways for the mixture of the fluid discharged from the inlet passageway to the mixing chamber, and a discharge spout operatively connected to the mixing chamber for the discharge of fluids from either of said inlet passageways or mixture thereof, said spherical socket housing including a recessed chamber operatively connected to the aforesaid mixing chamber, said discharge spout operatively connected to said recessed chamber, a passageway operatively connected to said mixing chamber and extending to the rear of the main body portion and adapted for connection to a bathtub shower head, valve means including disc valve means for controlling the flow of fluid from the recessed chamber to the discharge spout, said valve means including operator-operated means for adjusting the valve means from its fully closed position to its fully open position, said valve means in its open position permitting fluid to discharge from the mixing chamber to the discharge spout and in the closed position of the valve means diverting the fluid from the mixing chamber to the passage for fluid discharge to the bathtub shower head, said spherical socket housing formed with a face complemental to the outer face of the main body portion, said face of the spherical socket housing forming a closure for the mixing chamber of the main body portion, and securing means for affixing the spherical socket housing to the main body portion.

9. A mixing faucet comprising a main body portion formed with a mixing chamber operatively connected to a plurality of inlet passageways, said passageways being adapted for connection to fluid supply lines, valve means operatively associated with said inlet passageways for fluid discharge to the mixing chamber, a spherical socket housing operatively associated with said main body portion, said valve means operatively mounted within said spherical socket housing and including a valve operating member, disc valve means for closing each of said first-mentioned inlet passageways, flow-control means operatively associated with said disc valve means, said flow-control means operatively mounted in each of said inlet passageways for aligning said disc valve means with respect to the opening of the inlet passageways to the mixing chamber, universal linkage means including pivotally connected linkage rods operatively connected to each of said disc valve means and to said valve-operating member, spring-biasing means operatively mounted within the spherical socket housing and slidably connected between said valve-operating member and said inner periphery of the spherical socket housing for biasing the disc valve means in the closed position of the disc valve means and in any of the adjusted positions thereof between full closed and full opened position, operator-operated means operatively connected to said valve-operating member, a spherical triangular opening formed on the spherical socket housing through which the operator-operated means extend, said spherical triangular opening permitting annular adjustment of the valve-operating member for maintaining the disc valve means in each of their respective open or closed position or intermediate adjusted positions for discharge of fluid from one of said inlet passageways, both of said inlet passageways for the mixture of the fluid discharged from the inlet passageway to the mixing chamber, and a discharge spout operatively connected to the mixing chamber for the discharge of fluids from either of said inlet passageways or mixture thereof, a valve chamber operatively connected to said mixing chamber, a passageway in said body portion operatively connected to said mixing chamber and adapted for connecting to a spray head, and valve means operatively mounted in said valve chamber for controlling the discharge of fluid either to the discharge spout or to the passageway operatively connected to the spray head.

10. A mixing faucet comprising a main body portion formed with a mixing chamber operatively connected to inlet passageways, laterally extending integrally formed portions integrally formed with the main body portion, horizontally positioned passageways provided in said laterally extending integrally formed portions and operatively connected to said inlet passageways, said horizontal passageways including one or more passageways adapted for connecting the mixing faucet to laterally spaced inlet pipes, the others of these passageways adapted to be closed, a spout housing integrally formed with the main body portion including a passageway operatively connected to the mixing chamber, a swivel discharge spout operatively connected to the spout housing for discharging fluids therefrom in any of its angularly horizontally adjusted positions, valve means operatively associated with said mixing chamber for controlling the aforesaid passageways for fluid discharge to the mixing chamber, a spherical socket housing operatively associated with said main body portion, said valve means operatively mounted within said spherical socket housing and including a valve-operating member, disc valve means for closing each of said first-mentioned inlet passageways, universal linkage means including pivotally connected linkage rods operatively connecting said disc valve means and said valve-operating member, means for universally mounting said valve-operating member for operating said disc valve means from full open position to full closed position and intermediate positions thereof, operator-operated means operatively connected to said valve operating member for actuating said valve-operating member within a predetermined triangular area of a triangular opening through which the operator-operated means extends from full closed to full open and intermediate positions of said operator-operated means for controlling the discharge from each inlet passage and for blending the fluid mixture discharged from the inlet passageways, said valve-operating member complementally formed to the spherical surface of the spherical chamber formed by the spherical socket housing, and spring-biased means operatively engaging the valve-operating member and the inner spherical surface of the spherical socket housing for biasing the disc valve means in their respective operating positions.

11. A mixing faucet comprising a main body portion formed with a mixing chamber operatively connected to inlet passageways, laterally extending integrally formed portions integrally formed with the main body portion, horizontally positioned passageways provided in said laterally extending integrally formed portions and operatively connected to said inlet passageways, said horizontal passageways including one or more passageways adapted for connecting the mixing faucet to laterally spaced inlet pipes, the others of these passageways adapted to be closed, a spout housing integrally formed with the main body portion including a passageway operatively connected to the mixing chamber, a swivel discharge spout operatively connected to the spout housing for discharging fluids therefrom in any of its angularly horizontally adjusted positions, valve means operatively associated with said mixing chamber for controlling the aforesaid passageways for fluid discharge to the mixing chamber, a spherical socket housing operatively associated with said main body portion, said valve means operatively mounted within said spherical socket housing and including a valve-operating member, disc valve means for closing each of said first-mentioned inlet passageways, universal linkage means including pivotally connected linkage rods operatively connecting said disc valve means and said valve-operating member, means for universally mounting said valve-operating member for operating said disc valve means from full open position to full closed position and intermediate positions thereof, operator-operated means operatively connected to said valve operating member for actuating said valve-operating member within a predetermined triangular area of a triangular opening through which the operator-operated means extends from full closed to full open and intermediate positions of said operator-operated means for controlling the discharge from each inlet passage and for blending the fluid mixture discharged from the inlet passageways, said valve-operating member complementally formed to the spherical surface of the spherical chamber formed by the spherical socket housing, spring-biased means operatively engaging the valve-operating member and the inner spherical surface of the spherical socket housing, a valve chamber positioned below the mixing chamber, a passageway operatively connected to the aforesaid valve chamber at one end and at the opposite end operatively connected to a threaded opening, said threaded opening adapted to detachably receive a spray hose connection, valve means operatively mounted within the aforesaid valve chamber, operator-operated means operatively connected to the aforesaid valve means, said valve means provided with a port whereby in one position of the valve means the fluid from the mixing chamber is discharged to the swivel discharge spout, and in another position of the valve means, the fluid from the mixing chamber is discharged to the passageway for the spray hose, and in either of said positions of the valve means, fluid from the mixing chamber may not be discharged to the passageway closed by the valve means.

12. A mixing faucet comprising a main body portion formed with a mixing chamber operatively connected to inlet passageways, laterally extending integrally formed portions integrally formed with the main body portion, horizontally positioned passageways provided in said laterally extending integrally formed portions and operatively connected to said inlet passageways, said horizontal passageways including one or more passageways adapted for connecting the mixing faucet to laterally spaced inlet pipes, the others of these passageways adapted to be closed, a spout housing integrally formed with the main body portion including a passageway operatively connected to the mixing chamber, a swivel discharge spout operatively connected to the spout housing for discharging fluids therefrom in any of its angularly horizontally adjusted positions, valve means operatively associated with said mixing chamber for controlling the aforesaid passageways for fluid discharge to the mixing chamber, a spherical socket housing operatively associated with said main body portion, said valve means operatively mounted within said spherical socket housing and including a valve-operating member, disc valve means for closing each of said first-mentioned inlet passageways, universal linkage means for each of said disc valve means pivotally connected at one end to said disc valve means and pivotally connected at the other end to said valve-operating member, means for universally mounting said valve-operating member for operating said disc valve means from full open position to full closed position and intermediate positions thereof, operator-operated means operatively connected to said valve operating member for actuating said valve-operating member within a predetermined triangular opening from full closed to full open and intermediate positions thereof for controlling the discharge from each inlet passage and for blending the fluid mixture discharged from the inlet passageways, said valve-operating member complementally formed to the spherical surface of the spherical chamber formed by the spherical socket housing, spring-biased means operatively engaging the valve-operating member and the inner spherical surface of the spherical socket housing, said spherical socket housing formed with a planar surface complementally formed to the upper horizontal planar surface of the main body portion, said spherical socket housing providing a closure for the aforesaid mixing chamber, and said operator-operated means including an angular spindle extending through said triangular opening and to the rear and upwardly with respect to said spherical socket housing whereby the disc valve means may be adjusted from their full open to full closed and intermediate positions thereof within the mixing chamber.

13. A mixing faucet comprising a main body portion formed with a mixing chamber operatively connected to inlet passageways, laterally extending integrally formed portions integrally formed with the main body portion, horizontally positioned passageways provided in said laterally extending integrally formed portions and operatively connected to said inlet passageways, said horizontal passageways including one or more passageways adapted for connecting the mixing faucet to laterally spaced inlet pipes, the others of these passageways adapted to be closed, a spout housing integrally formed with the main body portion including a passageway operatively connected to the mixing chamber, valve means operatively associated with said mixing chamber for controlling the aforesaid passageways for fluid discharge to the mixing chamber, a spherical socket housing operatively associated with said main body portion, said valve means operatively mounted within said spherical socket housing and including a valve-operating member, disc valve means for closing each of said first-mentioned inlet passageways, universal linkage means for each of said disc valve means pivotally connected at one end to said disc valve means and pivotally connected at the other end to said valve-operating member, means for universally mounting said valve-operating member for operating said disc valve means from full open position to full closed position and intermediate positions thereof, operator-operated means operatively connected to said valve operating member for actuating said valve-operating member within a predetermined triangular opening from full closed to full open and intermediate positions thereof for controlling the discharge from each inlet passage and for blending the fluid mixture discharged from the inlet passageways, said valve-operating member complementally formed to the spherical surface of the spherical chamber formed by the spherical socket housing, spring-biased means operatively engaging the valve-operating member and the inner spherical surface of the spherical socket housing, said spherical socket housing formed with a planar surface complementally formed to the upper horizontal planar surface of the main body portion, said spherical socket housing providing a closure for the aforesaid mixing chamber, said operator-operated means including an angular spindle extending through said triangular opening and to the rear and upwardly with respect to said spherical socket housing whereby the disc valve means may be adjusted from their full open to full closed and intermediate positions thereof within the mixing chamber, and a discharge spout integrally formed with the main body portion and operatively connected to the mixing chamber whereby the fluid from the mixing chamber is discharged directly to the discharge spout on actuation of the operator-operated means.

14. A mixing faucet comprising a main body portion, a mixing chamber formed therein, inlet passage for connecting fluid piping to the mixing chamber, a spherical socket housing for detachably affixing to the main body portion, disc valve means for closing the passages from the inlet passages to the main body portion, a valve-operating member operatively mounted within the spherical socket housing, universal linkage including pivotally connected linkage rods for operatively connecting the disc valve means to the valve-operating means, spring-biased means for biasing the valve-operating member within the spherical socket housing and for biasing the disc valve means in a closed position and retaining the disc valve means in any of their adjusted positions, said spherical socket housing comprising a semi-spherical portion, and a detachable semi-spherical housing portion, said spherical housing portions complementally formed to complete the spherical socket housing, means for detachably affixing the detachable semi-spherical housing to the integrally formed semi-spherical portion, said integrally formed semi-spherical portion comprising an arcuate slot formed in the periphery thereof, pin means affixed to the valve-operating member and complementally formed to extend within the arcuate slot, a triangular opening formed in the detachable semi-spherical housing portion, and operator-operated means affixed to the valve-operating member and extending through the triangular opening, whereby upon actuation of the operator-operated means, the valve-operating member may be angularly adjusted about an axis of the valve-operating member within the arcuate range of the arcuate slot, and angularly adjusted about the axis of the pin extending at right angles to the aforesaid axis and at the center of the spherical socket housing so that in any of the adjusted positions of the operator-operated means within the triangular area, the valve-operating means may be swivelled about the aforesaid pin in any angular position thereof within the arcuate slot.

15. A mixing faucet comprising a main body portion, a mixing chamber formed therein, inlet passages for connecting fluid piping to the mixing chamber a spherical socket housing for detachably affixing to the main body portion, disc valve means for closing the passages from the inlet passages to the main body portion, a valve-operating member operatively mounted within the spherical socket housing, universal linkage means including pivotally connected linkage rods for operatively connecting the disc valve means to the valve-operating means, spring-biased means for biasing the valve-operating member within the spherical socket housing and for biasing the disc valve means in a closed position and retaining the disc valve means in any of their adjusted positions, said spherical socket housing comprising a semi-spherical portion, and a detachable semi-spherical housing portion, said spherical housing portions complementally formed to complete the spherical socket housing, means for detachably affixing the detachable semi-spherical housing to the integrally formed semi-spherical portion, said integrally formed semi-spherical portion comprising an arcuate slot formed in the periphery thereof, pin means affixed to the valve-operating member and complementally formed to extend within the arcuate slot, a triangular opening formed in the detachable semi-spherical housing portion, operator-operated means affixed to the valve-operating member and extending through the triangular opening, whereby upon actuation of the operator-operated means the valve-operating member may be angularly adjusted about an axis of the valve-operating member within the arcuate range of the arcuate slot, and angularly adjusted about the axis of the pin extending at right angles to the aforesaid axis and at the center of the spherical socket housing whereby in any of the adjusted positions of the operator-operated means within the triangular area, the valve-operating means may be swivelled about the aforesaid pin in any angular position thereof within the arcuate slot, said spring-biased means comprising a stud affixed to the valve-operating means, a cylindrical shaped member complementally formed and slidably mounted with respect to the stud means, spring means operatively mounted on the cylindrically shaped member and abutting the contiguous face of the valve-operating member at one end and at the other end abutting an integrally formed disc of the cylindrical shaped member, and roller means operatively mounted on the integrally formed disc shaped member for operative engagement with the inner spherical surface of the spherical socket housing.

16. A mixing valve comprising a valve body comprising a main body portion including a mixing chamber, inlet passages operatively connected to the mixing chamber and for operatively connecting to fluid piping, a spherical socket housing, disc valve means operatively controlling the openings of the aforesaid inlet passageways to the mixing chamber, a valve-operating member substantially spherical for operatively mounting within a spherical chamber of the spherical socket housing, universal linkage means including pivotally connected linkage rods for operatively connecting the disc-valve means to the valve-operating member, means for sealing the universal linkage means with respect to the mixing chamber, clearance means provided for the universal linkage means in the spherical socket housing and upon the valve-operating member, means for universally mounting the valve-operating member permitting the valve-operating member to rotate about one axis within a predetermined substantially vertical angular limitation and about another axis within a predetermined substantially horizontal angular range within the aforesaid predetermined substantially vertical angular limitation about the first-mentioned axis, spring-biasing means for biasing the disc valve means and for biasing the substantially spherical valve operating member within the spherical chamber of the spherical socket housing, a triangular opening in the peripheral surface of the spherical socket housing, and operator-operated means operatively mounted on the valve-operating member and extending through the triangular opening, whereby the disc valve means are adapted to be adjusted from full closed to full open and intermediate positions thereof for discharging fluids from each of the inlet passages or blended mixtures thereof.

References Cited in the file of this patent

UNITED STATES PATENTS

| | | |
|---|---|---|
| 1,517,956 | Compton | Dec. 2, 1924 |
| 2,205,684 | Cochran | June 25, 1940 |
| 2,262,291 | Kuhnle | Nov. 11, 1941 |
| 2,403,519 | Gardiner | July 9, 1946 |
| 2,497,558 | Reeves | Feb. 14, 1950 |
| 2,519,158 | Symmons | Aug. 15, 1950 |
| 2,792,847 | Spencer | May 21, 1957 |
| 2,813,474 | Kurth | Nov. 19, 1957 |
| 2,850,042 | Strazdins | Sept. 2, 1958 |

FOREIGN PATENTS

| | | |
|---|---|---|
| 426,313 | Italy | Oct. 23, 1947 |